United States Patent
McGeer et al.

(10) Patent No.: US 9,396,034 B2
(45) Date of Patent: Jul. 19, 2016

(54) JOB PLACEMENT BASED ON MODELING OF JOB SLOTS

(75) Inventors: Patrick Charles McGeer, Orinda, CA (US); Dejan S. Milojicic, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 772 days.

(21) Appl. No.: 13/561,217

(22) Filed: Jul. 30, 2012

(65) Prior Publication Data

US 2014/0033218 A1   Jan. 30, 2014

(51) Int. Cl.
*G06F 9/50* (2006.01)
*G06F 9/455* (2006.01)

(52) U.S. Cl.
CPC .............. *G06F 9/5066* (2013.01); *G06F 9/50* (2013.01); *G06F 9/5005* (2013.01); *G06F 9/45533* (2013.01)

(58) Field of Classification Search
CPC ..... G06F 9/45533; G06F 9/50; G06F 9/5027; G06F 9/5066; G06F 9/5005
USPC ............................... 709/226; 718/1, 100, 104
See application file for complete search history.

(56) References Cited

U.S. PATENT DOCUMENTS

| | | | | |
|---|---|---|---|---|
| 6,865,185 B1* | 3/2005 | Patel | ...................... | H04L 47/12 370/310 |
| 7,596,811 B2* | 9/2009 | Lloyd | ................. | H04L 12/2602 370/230 |
| 7,933,205 B1* | 4/2011 | Shaw | ...................... | H04L 41/12 370/235 |
| 8,424,007 B1* | 4/2013 | Hernacki | ................ | G06F 9/485 718/103 |
| 2002/0114274 A1* | 8/2002 | Sturges | ............... | H04L 12/5695 370/229 |
| 2004/0267897 A1* | 12/2004 | Hill | ......................... | G06F 9/505 709/217 |
| 2009/0320037 A1* | 12/2009 | Gokhale | ............... | G06F 9/5016 718/104 |
| 2010/0306377 A1 | 12/2010 | DeHaan | | |
| 2011/0239216 A1* | 9/2011 | Miyajima | ............... | G06F 9/455 718/1 |
| 2012/0042311 A1 | 2/2012 | Biran | | |
| 2012/0066020 A1 | 3/2012 | Moon | | |
| 2012/0096470 A1 | 4/2012 | Bartfai-Walcott | | |
| 2012/0131176 A1 | 5/2012 | Ferris | | |
| 2012/0185848 A1* | 7/2012 | Devarakonda | ...... | G06F 9/45533 718/1 |
| 2013/0091283 A1* | 4/2013 | Omar | .................. | H04L 41/0893 709/226 |
| 2013/0159637 A1* | 6/2013 | Forgette | ................ | G06F 3/0605 711/154 |

OTHER PUBLICATIONS

Rick McGeer, et al., On the Complexity of Power Minimization Schemes in Data Center Networks Dec. 2010 (5 pages).
Rick McGeer, et al., The Network Testbed Mapping Problem, 2010 (16 pages).
Jiang, J.W., et al., Joint VM Placement and Routing for Data Center Traffic Engineering, Mar. 25-30, 2012 (9 pages).

* cited by examiner

*Primary Examiner* — Jeong S Park
(74) *Attorney, Agent, or Firm* — Trop, Pruner & Hu, P.C.

(57) ABSTRACT

A collection of job slots correspond to placement of observed jobs associated with a plurality of job categories in a data processing environment. An incoming job is received, and based on a job category of the incoming job, the incoming job is assigned to a particular one of the job slots to perform placement of the incoming job on physical resources.

20 Claims, 5 Drawing Sheets

JOB PLACEMENT BASED ON MODELING OF JOB SLOTS

BACKGROUND

A data processing environment, such as a data center, can concurrently execute jobs on behalf of multiple requesters. In a data processing system that can be made up of a relatively large number of physical machines that are interconnected by switches, it can be difficult to determine an efficient placement of jobs on the physical machines. Also, if the number of jobs that are to be allocated is relatively large, computational resources that are consumed to perform the placement of jobs on physical machines can be relatively high.

BRIEF DESCRIPTION OF THE DRAWINGS

Some embodiments are described with respect to the following figures.

DETAILED DESCRIPTION

Figure 1:
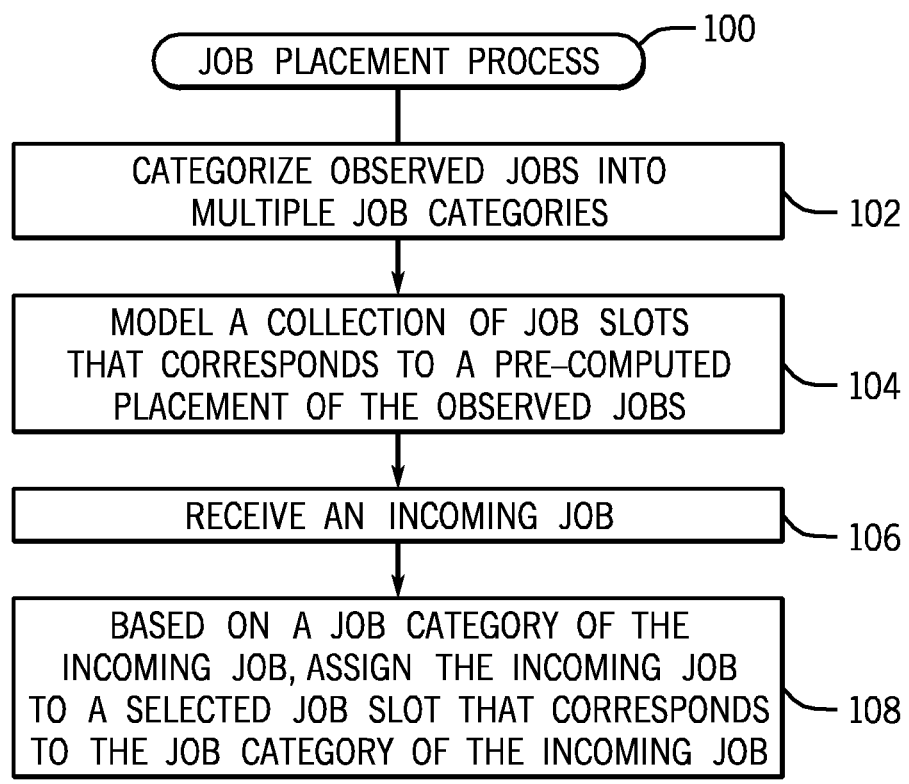
FIG. 1 is a flow diagram of a job placement process according to some implementations.

A data processing environment can include physical resources that can be allocated for job execution. In some examples, the data processing environment can include a data center, a cloud cluster, or any other type of data processing system that is capable of executing jobs on behalf of requesters (e.g. users, applications, or other entities). In some examples, the data processing environment can be a multi-tenant system, where the multiple tenants can refer to respective requesters that are capable of requesting job execution in the data processing system.

The physical resources on which job execution can occur can be provided by physical machines, such as server computers, storage controllers, communication controllers, and so forth. More generally, physical resources onto which jobs can be placed for execution can be referred to as "bins." A bin can include a physical machine, a portion of a physical machine, or multiple physical machines. More generally, a bin can refer to any container that can execute jobs or portions of jobs. More particularly, a bin can be defined as a logical container that can hold multiple virtual machines (virtual machines are discussed below). A virtual machine can switch positions within a bin without consuming additional resources or affecting any Service Level Agreements for a corresponding job.

The problem of identifying a placement of jobs onto bins can be computationally expensive. This is particularly the case if there is a relatively large number of jobs that have to be processed at any given time, and when the data processing environment in which the jobs are executed is relatively complex (e.g. the data processing environment includes a relatively large number of physical machines that are interconnected by interconnect infrastructure having a relatively large number of switches).

In some implementations, a job can include a number of virtual machines, where the virtual machines of the job may be placed on one or multiple bins. A virtual machine can refer to a partition or segment of a physical machine, where the virtual machine is provided to virtualize or emulate a physical machine. From the perspective of a user or application, a virtual machine looks like a physical machine. The virtual machine can include a guest operating system and one or multiple applications.

More generally, a job can include execution units, where each of the execution units can be individually placed on a corresponding bin. In the ensuing discussion, reference is made to placing virtual machines of jobs onto bins. In more general implementations, execution units of jobs can be placed onto bins.

When a job is placed onto particular bins, the virtual machines of the job are loaded onto the particular bins, and switches between the particular bins are configured to support data communications that are to occur among the virtual machines of the job. The virtual machines of a job can also collectively be referred to as a virtual network; the switches are configured to support such virtual network once the virtual machines of a job are placed onto respective bins. Configuring a switch can refer to updating routing information (e.g. a routing table) in the switch to define how data units associated with specific virtual machines are to be routed.

If there are a relatively large number of switches, having to reconfigure the switches upon receipt of each new incoming job for placement in the data processing environment can be time-consuming and computationally expensive. Generally, reconfiguring switches can take more time than loading a virtual machine into a physical machine for execution.

In accordance with some implementations, techniques or mechanisms are provided for placing jobs onto bins that reduce the computational time for performing the job placement. In some implementations, placement of a job can be achieved without having to reconfigure switches in the data processing environment. By omitting reconfiguration of switches, job placement can be performed in constant time, or within a time that is proportional to a logarithm of the size of the job and the size of the data processing environment. In some examples, the time for performing job assignment can be as little as the time involved in loading virtual machines of the job onto respective physical machines.

In accordance with some implementations, job placement is achieved by pre-computing placement of observed jobs onto bins of the data processing environment. "Observed jobs" can refer to some collection of actual jobs that have been observed over some time period (e.g. hours, days, weeks, months, years, etc.). The notion is that the collection of observed jobs represent jobs that are likely to be received in the future (in other words, such observed jobs in the collection are likely to be typical of jobs that execute in the data processing environment). Pre-computing placement of the observed jobs onto bins can be based on various factors, including service goals (e.g. Service Level Agreements or SLAs), characteristics associated with the physical machines and links (including switches) between the physical machines, and other factors. Examples of characteristics that can be considered include the load of physical machines and the load of switches. Such loads of the physical machines and switches can affect whether or not a service goal of a job to be placed can be met.

The placement of an observed job involves placing virtual machines associated with the observed job on one or multiple bins of the data processing system. Thus, for example, job 1 can have virtual machines VM1, VM2, and VM3. VM1 and VM2 can be placed on bin 1, while VM3 can be placed on bin 2. As another example, job 2 can have virtual machines VM4, VM5, VM6, and VM7. VM4 and VM6 can be placed on bin 2, and VM5 and VM7 can be placed on bin 3, for example. The foregoing placement of virtual machines of observed jobs is made such that service goals (e.g. SLAs) of the observed jobs can be satisfied.

Given the pre-computed placement of virtual machines of respective observed jobs on corresponding bins, job slots can be defined. A job slot corresponding to placement of a given observed job onto particular bin(s) includes a combination of the following: (1) the resources in the particular bin(s) allocated to the virtual machines of the given observed job; and (2) the routing configuration (e.g. routing table programming) of the switch(es) to enable communication among the virtual machines of the given observed job. This routing configuration of the switch(es) is considered a pre-configuration that can be used when a new job is placed (discussed further below).

In the foregoing example, the job slot corresponding to job 1 (which was placed on bins 1 and 2) includes the allocated resources in bin 1 for VM1 and VM2, and the allocated resources in bin 2 for VM3. Similarly, the job slot corresponding to job 2 (which was placed on bins 2 and 3) includes the allocated resources in bin 2 for VM4 and VM6, and the allocated resources in bin 3 for VM5 and VM7.

More generally, a job slot corresponding to placement of an observed job onto selected bin(s) includes resources in physical machine(s) and switch(es) allocated to the virtual machines of the observed job.

The pre-computed placement of observed jobs on respective bins is a placement that satisfies the service goals (e.g. SLAs) for the corresponding observed jobs. This pre-computed placement of observed jobs can be considered a static allocation of a model collection of job slots. It is noted that the job slots based on the pre-computed placement of observed jobs can be initially marked as empty (or available for placement of subsequently received jobs).

When a new job is received in the data processing environment, the new job is matched to an available (unfilled) job slot. Note that the available job slot includes the resources of the physical machine(s) and switch(es) that were allocated to the respective observed job performed as part of the pre-computed placement discussed above. Once a job slot is selected for placement of the new job, the job slot is marked as filled, and the virtual machines in the new job are assigned to the allocated resources of the selected job slot. When the new job completes execution, the selected job slot can again be marked as available.

FIG. 1 is a flow diagram of a job placement process 100 according to some implementations. The job placement process 100 categorizes (at 102) observed jobs into multiple job categories. Categorizing an observed job into a particular job category can be based on various parameters, including any combination of the following: a number of virtual machines in the observed job, characteristics of each virtual machine (e.g. type of guest operating system in the virtual machine, a memory specification (to specify a target amount of memory desired), a storage device specification (to specify a target amount of persistent storage space desired), a processor specification (to specify a target processor speed or other characteristic desired), storage specifications, and an inter-virtual machine bandwidth specification (to specify a target bandwidth over a link that is desired). Note that certain characteristics of the virtual machine can indicate a size of the virtual machine (e.g. a virtual machine can be considered to be large if it specifies usage of a large amount of memory or a high-capacity processor). In other examples, job categorization can be based on other parameters.

As examples, observed jobs can be categorized into the following categories: communication-intensive category (virtual machines in this observed job may specify relatively large bandwidth usage over links between the virtual machines); storage-intensive category (virtual machines in this observed job may specify relatively large consumption of storage space in persistent storage media); processor-intensive category (virtual machines in this observed job may specify that they have to execute on relatively high-speed processors); and memory-intensive category (virtual machines in this observed job may specify that it is expected to consume relatively large volatile memory space). In other examples, other job categories can be specified.

The job placement process 100 next models (at 104) a collection of job slots that correspond to the pre-computed placement of observed jobs onto respective bins. Each job slot can be associated with the job category of the corresponding observed job. For example, for an observed job categorized into category X, the corresponding job slot based on the pre-computed placement is also associated with category X.

The job placement process 100 next receives (at 106) an incoming job. Based on a job category of the incoming job (which can be categorized based on similar parameters as used to categorize the observed jobs), the incoming job is assigned (at 108) to a selected one of the job slots that are associated with the job category of the incoming job. Assigning the incoming job to the selected job slot causes the virtual machines of the incoming job to be placed on the bin(s) of the selected job slot. Note also that this selected job slot is associated with preconfigured switch(es) that allow for data communication among the virtual machines of the incoming job. In this manner, placement of an incoming job onto bin(s) of the data processing environment does not have to involve reconfiguring switch(es), which can be time consuming.

Figure 2:
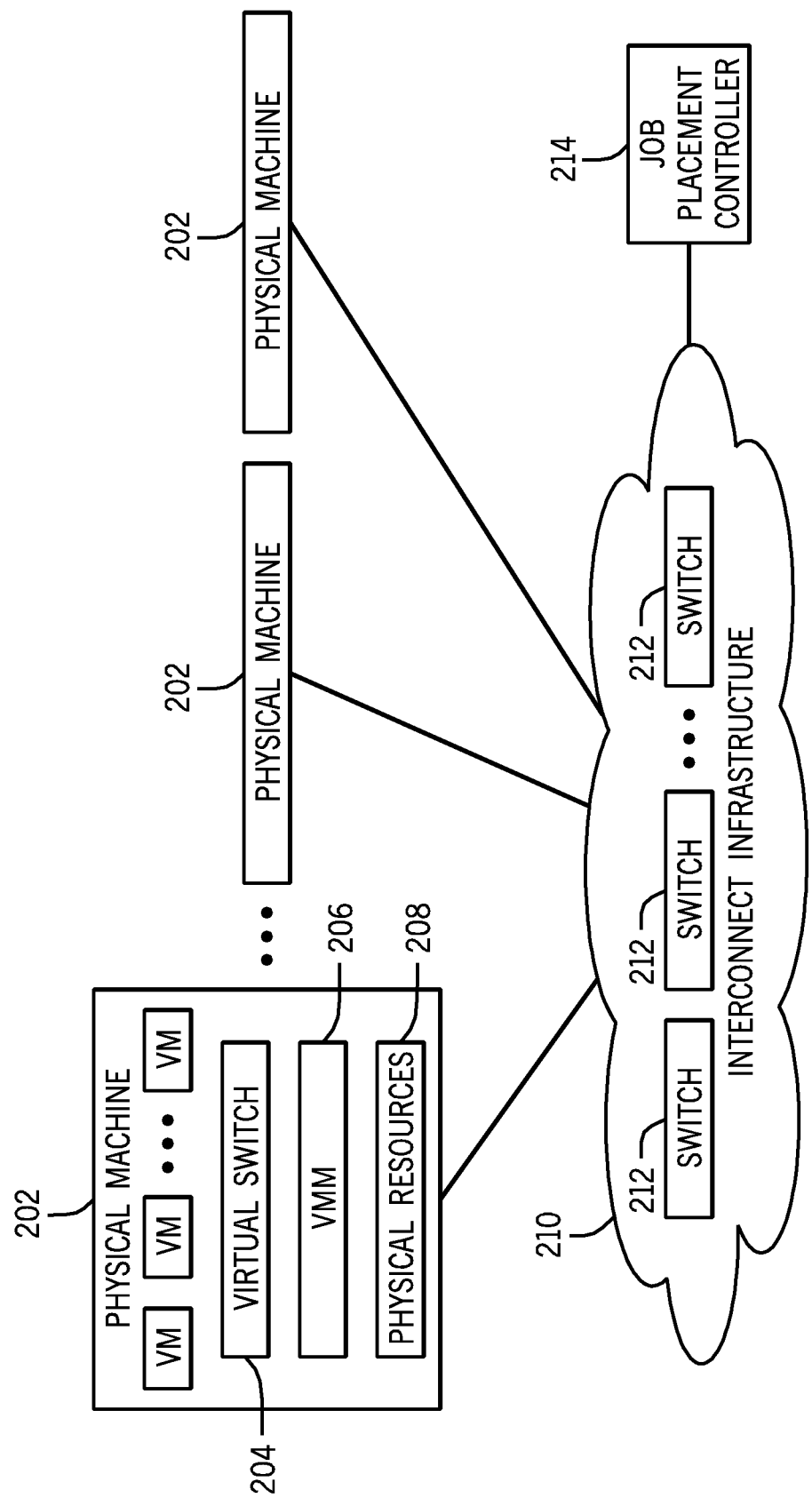
FIG. 2 is a block diagram of an example data processing arrangement incorporating a job placement controller according to some implementations.

FIG. 2 is a block diagram of an example data processing environment according to some implementations. The data processing environment includes various physical machines 202, each executing respective virtual machines (VMs). The virtual machines that may be present in a physical machine 202 can correspond to one job or to multiple jobs. Each physical machine 202 includes a virtual switch 204, which is used to perform network address translation. The network address translation involves translating a network address in a data unit (e.g. data packet, data frame, etc.) to perform data routing between a source and a destination. Network address translation is discussed further below. An example of a network address is an Internet Protocol (IP) address.

As further depicted in FIG. 2, the physical machine 202 can include a virtual machine monitor (VMM) 206, also referred to as a hypervisor. The VMM 206 can be provided to allow virtual machines to share physical resources 208 of the physical machine 202. The VMM 206 virtualizes the physical resources 208 of the physical machine, and intercepts requests for resources from guest operating systems in respective virtual machines so that proper allocation of physical resources of the physical machine 202 can be performed for the virtual machines. The VMM 206 can manage memory access, input/output (I/O) device access, CPU scheduling, and so forth. More generally, the VMM 206 provides an interface between a guest operating system in each of the virtual machines and the underlying physical resources 208 of the physical machine 202. The physical resources 208 of the physical machine 202 can include a processor, a storage device, a memory, a network interface controller, a graphics controller, and so forth.

Generally, as discussed above, a bin onto which a virtual machine (or multiple virtual machines) of a job can be placed can include a physical machine, a portion of the physical machine (such as a subset of the physical resources 208 of the physical machine), or multiple physical machines.

The physical machines 202 are interconnected by an interconnect infrastructure 210, which can include various switches 212. Different groups of physical machines 202 can be interconnected by different subsets of the switches 212.

A job placement controller 214 according to some implementations can perform the job placement process 100 of FIG. 1, or other processes as discussed below.

Figure 3:
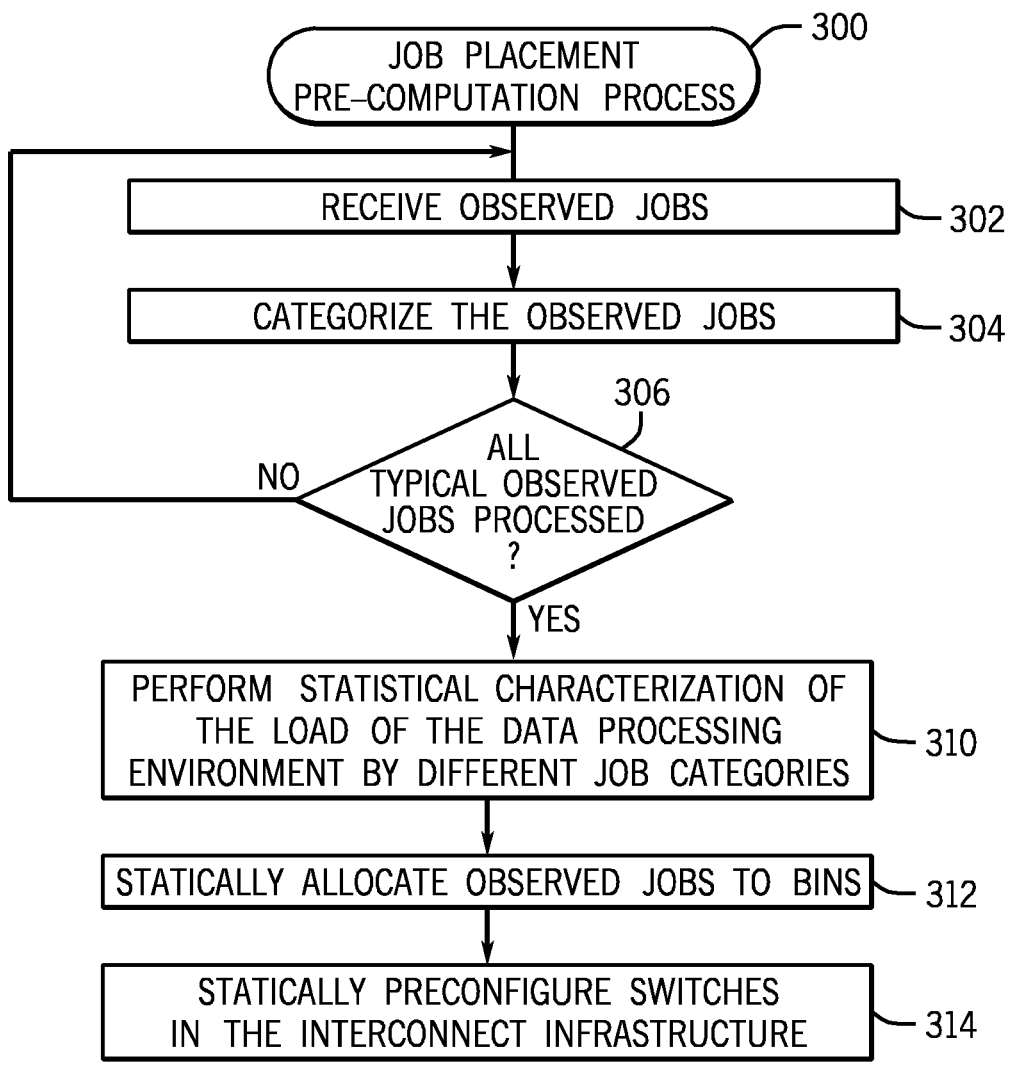
FIG. 3 is a flow diagram of a job placement pre-computation process according to some implementations.

FIG. 3 is a flow diagram of a job placement pre-computation process 300 according to some implementations. The process 300 can be performed by the job placement controller 214, for example, or by another controller. The process 300 receives (at 302) observed jobs, where the received observed jobs are those determined to be typical of jobs executed in a data processing environment. The process 300 next categorizes (at 304) the observed jobs based on various parameters, such as number of virtual machines, virtual machine characteristics, and inter-virtual machine bandwidth specifications.

The process 300 next determines (at 306) if all typical observed jobs have been processed. If not, tasks 302 and 304 are repeated.

After all typical observed jobs are determined (at 306) to have been processed, the process 300 next performs (at 310) a statistical characterization of the load in the data processing environment by different job categories. For example, this statistical characterization can determine that observed communication-intensive jobs take up 50% of the load, observed storage-intensive jobs take up 30% of the load, observed first-type CPU-intensive jobs take up 10% of the load, observed memory-intensive jobs take up 5% of the load, and observed second-type CPU-intensive jobs take up 5% of the load. The foregoing assumes that five job categories were identified at 304, including a communication-intensive category, a storage-intensive category, a first-type CPU-intensive category, a memory-intensive category, and a second-type CPU-intensive category.

Given the foregoing example, the following statistical characterization, expressed in table format for convenience, can be derived:

TABLE 1

| Job Categories | Number of Virtual Machines | Probability | Total Bin Weight | Total Projected Weight |
|---|---|---|---|---|
| Communication-Intensive | 4 | 0.5 | 8 | 4 |
| Storage-Intensive | 4 | 0.3 | 8 | 2.4 |
| CPU-Intensive | 10 | 0.1 | 10 | 1 |
| Memory-Intensive | 250 | 0.05 | 4000 | 200 |

In the foregoing Table 1, the first column lists the five different example job categories. The second column specifies the number of virtual machines of each observed job in the respective category. For example, an observed job according to the communication-intensive job category has four virtual machines. The third column lists the probability of occurrence of observed jobs for the respective job category. For example, in the communication-intensive row of Table 1, the probability column specifies that the expected load of communication-intensive jobs is 50%.

The fourth column specifies the total bin weight of an observed job of the respective job category. For example, for the communication-intensive category, the total bin weight is 8, which means that an observed job according to the communication-intensive job category is expected to consume 8 bins.

The last column of Table 1 lists the total projected weight for each of the job categories. The total projected weight is computed by multiplying the probability by the total bin weight. Thus, for example, in the storage-intensive row of Table 1, the total projected weight is 2.4, which is equal to 8 (the total bin weight) multiplied by 30%.

In an example where a data processing environment is arranged to accommodate a total number of 1,000 jobs across the five example job categories noted above, the probabilities listed in column 3 of Table 1 can be multiplied by 1,000 to obtain the projected model load for each job category, such as expressed in the Table 2 below:

TABLE 2

| Job Categories | Number of Virtual Machines | Number of Job Slots |
|---|---|---|
| Communication-Intensive | 4 | 500 |
| Storage-Intensive | 4 | 300 |
| CPU-Intensive 1 | 10 | 100 |
| Memory-Intensive | 250 | 50 |
| CPU-Intensive 2 | 100 | 50 |

In Table 2, the first column lists the job categories, the second column lists the number of virtual machines for an observed job according to each respective job category, and the third column lists the number of job slots for each respective job category in the model load. For example, 500 job slots are allocated for the communication-intensive category, 300 job slots are allocated to the storage-intensive job category, and so forth.

Given the foregoing model load, observed jobs are placed among bins of the data processing environment according to the foregoing load distribution for each job category. For example, 500 observed communication-intensive jobs are placed onto bins of the data processing environment, 300 storage-intensive observed jobs are placed onto bins, and so forth. The placement of these observed jobs can be accomplished using any of various job placement techniques, such as simulated annealing techniques, multiway partitioning techniques, and so forth. The placement of the observed jobs according to the model load is done in a way that service goals of the observed jobs are satisfied.

The placement of the observed jobs of the model load results in a static allocation (at 312) of observed jobs in the model load to bins. Also, this placement of the observed jobs results in a static pre-configuration (at 314) of switches in the interconnect infrastructure 210 (FIG. 2).

The foregoing static allocation of observed jobs to bins and the static pre-configuration of switches result in definition of job slots, as discussed above. These job slots are initially marked as empty to allow for placement of new incoming jobs.

It is noted that each observed job in the model load is assigned respective network addresses. For example, an observed job having n (n≥1) virtual machines can be assigned n network addresses corresponding to the n virtual machines. The network addresses of the virtual machines of the statically placed observed jobs are used to configure respective switches 212 in the interconnect infrastructure 210, to allow the switches to route data among virtual machines. Each switch can include a routing table (or other type of routing data structure) that contains entries for routing a data unit to a particular slot of the switch. For example, if a data unit having a source address X and a destination address Y is received, the addresses X and Y are mapped to an entry of the routing table, which specifies that such data unit should be routed to port Z. By programming the routing tables of switches, data units to be communicated between virtual machines of a particular job can be correctly routed to appropriate destinations (physical machines) that contain the virtual machines of the particular job.

As discussed further below, the network addresses that are assigned to virtual machines of the observed jobs, and as configured in the routing tables of the switches 212, are used for routing data units for new jobs that are subsequently allocated to respective job slots.

Figure 4:
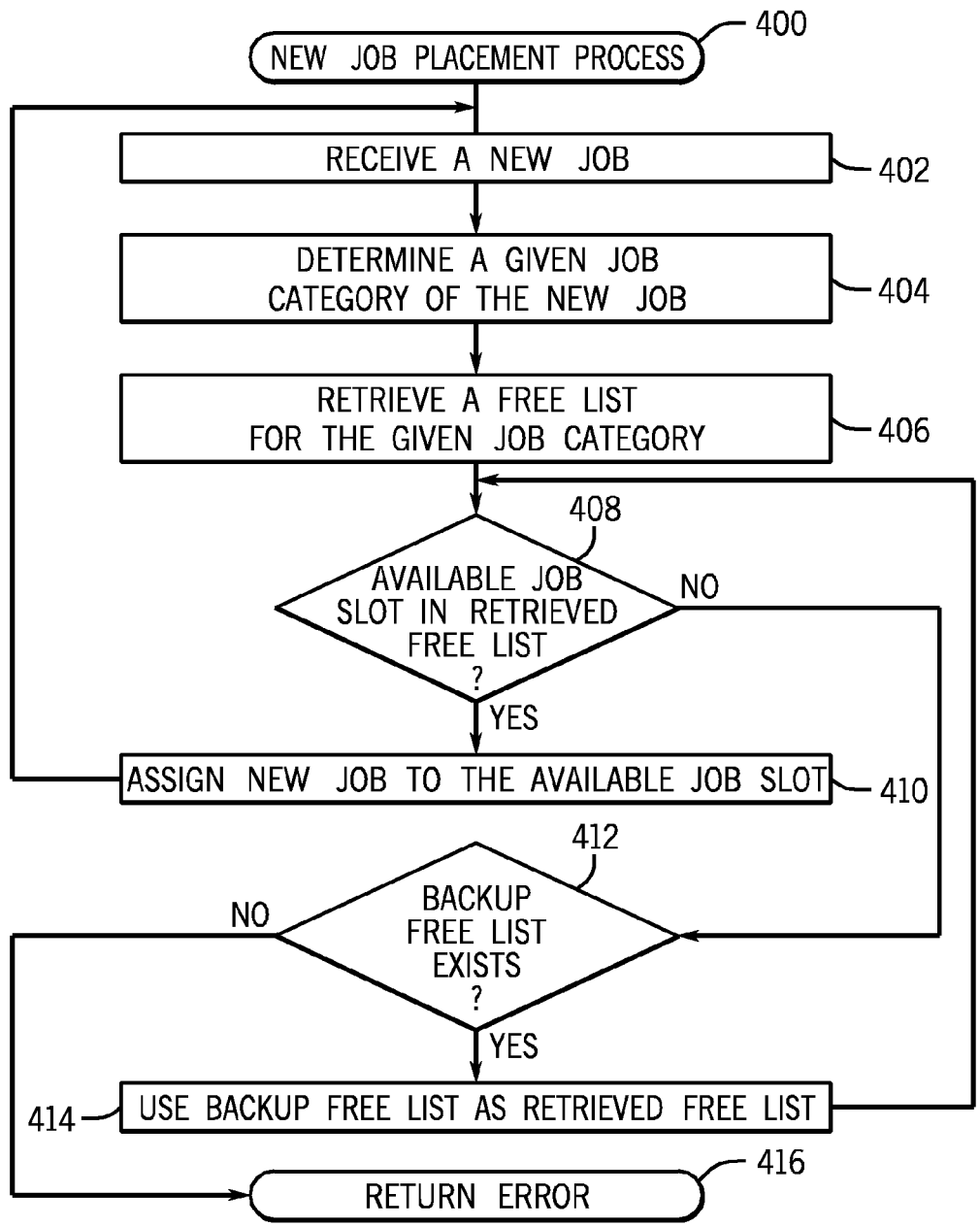
FIG. 4 is a flow diagram of a new job placement process according to further implementations.

FIG. 4 is a flow diagram of a new job placement process 400 according to some implementations. The process 400 can also be performed by the job placement controller 214 of FIG. 2, for example. The process 400 receives (at 402) a new job. In response to receiving the new job, the process 400 determines (at 404) a given job category of the new job, based on the same or similar parameters used for categorizing observed jobs discussed above. In some examples, each job category can be associated with a respective free list, which is a list of available job slots that can be allocated to new jobs of that category. Thus, if there are m (m 2) job categories, then there would be m free lists.

The process 400 next retrieves (at 406) the free list for the given category determined at 404. The process 400 then determines (at 408) if there is an available job slot on the retrieved free list. If there is an available job slot available on the retrieved free list, then the process 400 assigns (at 410) the new job to the available job slot on the retrieved free list. This assignment (at 410) results in loading of the virtual machines of the new job onto respective bins associated with the assigned available job slot.

In addition, the assignment also results in configuring respective virtual switches 204 (FIG. 2) of the physical machines 202 associated with the assigned job slot. The configuring of a virtual switch 204 involves configuring network address translation tables (or other network address translation data structures) to perform translation between the network addresses (referred to as "actual network addresses") of the virtual machines of the new job and network addresses (referred to as "model network addresses") of the virtual machines of the observed job that corresponds to the assigned job slot. Thus, the network address translation table of a virtual switch 204 translates between actual network addresses of a new job and the model network addresses of an observed job in a model load.

A data unit transmitted from a virtual machine of the new job contains the actual network address of the transmitting virtual machine. Using the network address translation table at a virtual switch 204, the actual network address of the transmitting virtual machine is translated to the corresponding model network address. This model network address is inserted into the data unit in place of the actual network address of the transmitting virtual machine. The data unit with the model network address is communicated over the interconnect infrastructure 210. Note that the affected switches 212 in the path of this data unit include routing tables that contain the model network address, so that the data unit can be correctly routed to a destination.

When a virtual switch 204 receives a data unit containing a model network address, the virtual switch 204 translates the model network address into an actual network address of a destination virtual machine (that is part of the new job). This translated actual network address is then inserted into the data unit, and the data unit is then sent to the destination virtual machine.

The network address translation table in a virtual switch 204 can also use a job identifier to disambiguate among network addresses assigned to virtual machines in scenarios where it is possible to assign a common network address to different virtual machines of different jobs.

If the process 400 determines (at 408) that there is no available job slot in the retrieved free list, then the process 400 can determine if there is a backup free list for the job category (at 412). In some implementations, it may be possible for a job category to be assigned a respective group of one or multiple backup categories. Thus, if a free list for a given category does not contain any available job slots, then a free list for a backup category can be retrieved. Note that if there are multiple backup categories, then these multiple backup categories can be ordered according to some criterion, such that the free lists for these multiple backup categories can be considered in that order.

In some examples, a category A can be considered a backup for category B if jobs of category B can freely be assigned to category A. This can occur when specifications (e.g. virtual machine size, inter-virtual machine bandwidth specification, etc.) of category A exceeds respective specifications of category B.

If the process 400 determines that there is an available backup free list, then the backup free list is used (at 414) as the retrieved free list, and the tasks 408 are repeated. However, if there is no backup free list associated with the given list, then the process 400 returns (at 416) an error.

Figure 5:
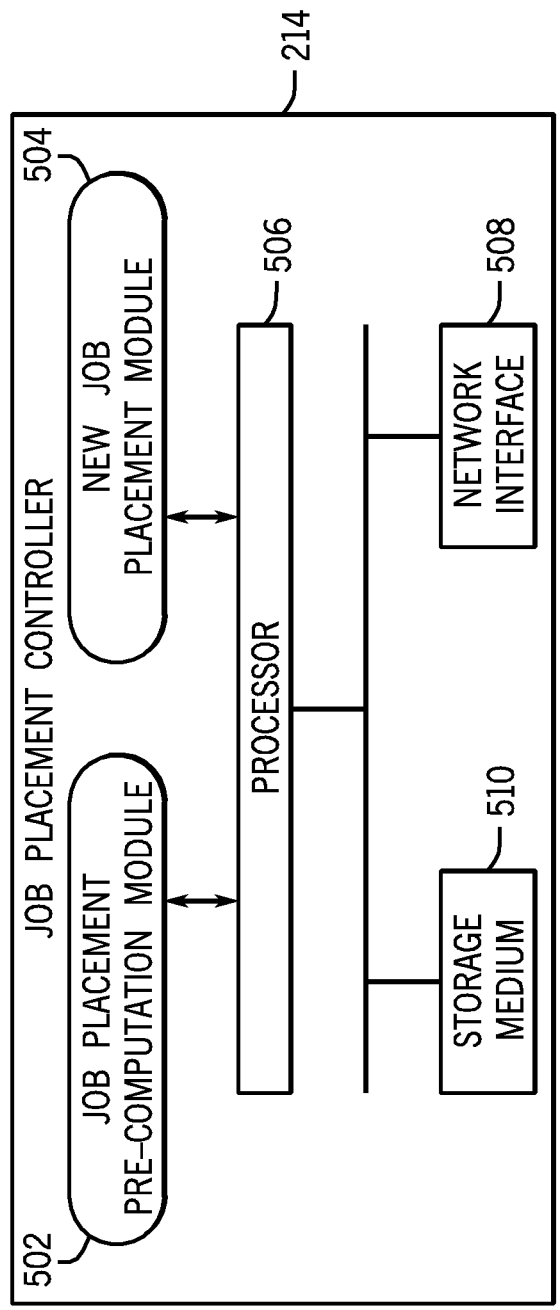
FIG. 5 is a block diagram of an example system that incorporates some implementations.

FIG. 5 is a block diagram of the job placement controller 214 according to some implementations. The job placement controller 214 includes a job placement pre-computation module 502 and a new job placement module 504. The job placement pre-computation module 502 can perform the tasks of FIG. 3, for example, while the new job placement module 504 can perform the tasks of FIG. 4, for example. The tasks of FIG. 1 can be performed by a combination of the modules 502 and 504.

In other implementations, the modules 502 and 504 can be provided in different controllers.

The modules 502 and 504 can be implemented with machine-readable instructions that are loaded for execution on a processor or processors 506. A processor can include a microprocessor, microcontroller, processor module or subsystem, programmable integrated circuit, programmable gate array, or another control or computing device.

The processor(s) 506 can be coupled to a network interface 508, which allows the job placement controller 214 to communicate over a data network. The processor(s) 506 can also be coupled to a storage medium (or storage media) 510.

The storage medium or storage media 510 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
statically assign, by a system having a processor, observed jobs across physical resources, where the static assignment produces a model of job slots that correspond to placement of observed jobs associated with a plurality of job categories in a data processing environment, wherein each job slot of the job slots includes:
at least one physical resource of the physical resources, the at least one physical resource assigned to a respective observed job, and
a routing configuration of at least one switch, the routing configuration defining routing of data units of the respective observed job by the at least one switch;
receiving, by the system, an incoming job; and
based on a job category of the incoming job, assigning the incoming job to a particular job slot of the job slots to perform placement of the incoming job on the at least one physical resource of the particular job slot and to use the routing configuration of the particular job slot.

2. The method of claim 1, further comprising
after the static assignment, initially marking the job slots as available for assignment to further jobs.

3. The method of claim 2, wherein the observed jobs are associated with corresponding network addresses, and wherein the static assignment comprises programming routing data structures in switches in an interconnect infrastructure according to the network addresses for routing of data units, wherein the routing configurations of the job slots are based on the programming of the routing data structures in the switches.

4. The method of claim 3, wherein the programming of the routing data structures is to preserve service goals associated with the observed jobs.

5. The method of claim 3, wherein a given observed job corresponding to the particular job slot has at least one network address, the method further comprising:
using the at least one network address of the given observed job for data communication of the incoming job, based on the routing configuration of the particular job slot.

6. The method of claim 5, wherein the incoming job is executed in at least a given physical machine, the method further comprising:
performing address translation using a virtual switch in the given physical machine, the address translation translating between at least one actual network address of the incoming job and the at least one network address of the given observed job.

7. The method of claim 1, further comprising:
categorizing, into the plurality of categories, the observed jobs based on parameters selected from among a number of virtual machines in a job, a characteristic of a virtual machine in a job, and an inter-virtual machine bandwidth specification.

8. The method of claim 1, further comprising:
statistically characterizing a load of the data processing environment by the plurality of categories; and
pre-computing a placement of the observed jobs based on the statistical characterization.

9. The method of claim 1, further comprising:
associating each of the plurality of job categories with a free list that identifies any available job slot for the corresponding job category;
in response to receiving the incoming job, retrieving the free list corresponding to the job category of the incoming job to determine whether the retrieved free list identifies any available job slot,
wherein the particular job slot assigned to the incoming job is from the retrieved free list if the retrieved free list identifies any available job slot.

10. The method of claim 9, further comprising:
in response to the retrieved free list indicating that there is no available job slot, retrieving a backup free list associated with a backup job category to determine whether the retrieved backup free list identifies any available job slot,
wherein the particular job slot assigned to the incoming job is from the retrieved backup free list if the retrieved backup free list identifies any available job slot.

11. An article comprising at least one non-transitory machine-readable storage medium storing instructions that upon execution cause a system to:
statically assign observed jobs across physical resources, where the static assignment produces a model of job slots that correspond to the observed jobs as assigned across the physical resources, wherein the observed jobs are categorized into a plurality of categories, wherein each job slot of the job slots includes:
at least one physical resource of the physical resources, the at least one physical resource assigned to a respective observed job, and
a routing configuration of at least one switch, the routing configuration defining routing of data units of the respective observed job by the at least one switch;
receive an incoming job; and
assign the incoming job to a particular job slot of the job slots based on a category of the incoming job to perform placement of the incoming job on a subset of the physical resources, and to use the routing configuration of the particular job slot.

12. The article of claim 11, wherein the incoming job includes a plurality of virtual machines, and the routing configuration of the particular job slot is used to perform data communications of the virtual machines.

13. The article of claim 11, wherein the instructions upon execution cause the system to categorize the observed jobs based on characteristics of the observed jobs.

14. The article of claim 11, wherein the particular job slot includes physical resources allocated to the corresponding observed job, and a routing configuration of one or multiple switches.

15. The article of claim 14, wherein the routing configuration of the one or multiple switches is used to route data between execution units of the incoming job.

16. The article of claim 11, where the static assignment of the observed jobs satisfies service goals of the observed jobs.

17. The article of claim 11, wherein the observed jobs are associated with respective model network addresses, and wherein the instructions upon execution cause the system to further:

in response to assigning the incoming job to the particular job slot, programming network address translation information in at least one virtual switch to translate between the model network addresses and actual network addresses of the incoming job.

18. A placement controller comprising:

at least one processor to:

pre-compute a static placement of observed jobs onto bins of a data processing environment, wherein the pre-computed static placement produces a model collection of job slots that correspond to placement of the observed jobs, wherein the observed jobs are associated with a plurality of job categories in a data processing environment, wherein each job slot of the job slots includes:

at least one physical resource of the data processing environment assigned to a respective observed job, and a routing configuration of at least one switch, the routing configuration defining routing of data units of the respective observed job by the at least one switch;

receive an incoming job; and based on a job category of the incoming job, assign the incoming job to a particular job slot of the job slots to perform placement of the incoming job on the at least one physical resource of the particular job slot and to use the routing configuration of the particular job slot.

19. The placement controller of claim 18, wherein the at least one switch is part of switches in an interconnect infrastructure between physical machines of the data processing environment.

20. The placement controller of claim 18, wherein the routing configuration of the at least one switch of each job slot of the job slots is based on programming of a routing table of the at least one switch.

* * * * *